(12) United States Patent
Nakazeki

(10) Patent No.: US 7,780,569 B2
(45) Date of Patent: Aug. 24, 2010

(54) TRACTION DRIVE TYPE CONTINUOUSLY VARIABLE TRANSMISSION

(75) Inventor: Tsugito Nakazeki, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 1102 days.

(21) Appl. No.: 10/544,992

(22) PCT Filed: Feb. 4, 2004

(86) PCT No.: PCT/JP2004/001156

§ 371 (c)(1),
(2), (4) Date: Apr. 14, 2006

(87) PCT Pub. No.: WO2004/070233

PCT Pub. Date: Aug. 19, 2004

(65) Prior Publication Data

US 2006/0223667 A1  Oct. 5, 2006

(30) Foreign Application Priority Data

Feb. 10, 2003  (JP) ............................. 2003-032704
Oct. 31, 2003  (JP) ............................. 2003-372635
Dec. 9, 2003   (JP) ............................. 2003-410715

(51) Int. Cl.
*F16H 15/22* (2006.01)

(52) U.S. Cl. ......................................... 476/53; 476/52

(58) Field of Classification Search .................. 476/52, 476/53
See application file for complete search history.

(56) References Cited

U.S. PATENT DOCUMENTS

| | | | |
|---|---|---|---|
| 674,701 | A | 5/1901 | Kelso |
| 2,480,968 | A | 9/1949 | Ronai |
| 3,440,893 | A | 4/1969 | Heynau |
| 5,601,507 | A | 2/1997 | Hoogenberg |

FOREIGN PATENT DOCUMENTS

| | | |
|---|---|---|
| CH | 235 100 A | 11/1944 |
| DE | 840 037 C | 5/1952 |
| DE | 31 27 883 A1 | 2/1983 |
| DE | 81 34 990 U1 | 5/1986 |
| JP | 41-13689 B1 | 8/1966 |
| JP | 111962/1971 | 8/1973 |
| JP | 72971/1976 | 12/1977 |
| JP | 4-83950 A | 3/1992 |
| JP | 8-507849 A | 8/1996 |
| JP | 10-184835 A | 7/1998 |
| JP | 2002-206607 A | 7/2002 |

*Primary Examiner*—William C Joyce
(74) *Attorney, Agent, or Firm*—Arent Fox LLP

(57) ABSTRACT

A traction drive type continuously variable transmission, comprising a first input/output shaft (6) rotatably supported on a casing (10), a second input/output shaft (7) rotatably supported on the casing (10), a V-pulley (4) supported on the first input/output shaft (6) and having a pair of pulley members forming a V-groove with variable grove width, a ring (3) engaged with the V-pulley (4) and supported at the outer periphery thereof, and a mechanism for moving the ring (3) to the periphery of the second input/output shaft (7).

19 Claims, 16 Drawing Sheets

TRACTION DRIVE TYPE CONTINUOUSLY VARIABLE TRANSMISSION

CROSS-REFERENCE TO RELATED APPLICATION

This application is a National Stage entry of International Application No. PCT/JP2004/001156, filed Feb. 4, 2004, the entire specification claims and drawings of which are incorporated herewith by reference.

TECHNICAL FIELD

This invention relates to a traction drive type continuously variable transmission used in automobiles and various industrial machines.

BACKGROUND ART

Many inventions have heretofore been made concerning the continuously variable transmission (CVT). Recently, the half toroidal type (FIG. 4) has gained attention; however, the direction of practicality is toward the use of a metal belt type (FIGS. 5a and 5b). Reference: "Development of Traction Drive Type Continuously Variable Transmission, Second Report—Comparison between Half Toroidal CVT and Full Toroidal CVT," NSK Technical Journal No. 670 (2000), Nippon Seiko K. K., pp. 2-10.

DISCLOSURE OF THE INVENTION

The problem for traction drive devices is to efficiently transmit large torque with size compaction. To obtain large transmission torque with size compaction, this may be attained by giving a large contact force; however, excessively large contact stress shortens life. To reduce the contact stress, if the device is designed to increase the contact area, the spin component in the contact region increases, lowering the transmission efficiency.

It is the half toroidal type and metal belt type that have solved these problems to a certain extent, not completely, however, and each has its drawbacks. The half toroidal type swings and changes speed in a state in which a power roller is pressed against an input/output disk surface. A large contact pressure acts thereon, and if no oil film is formed, seizure is caused. Avoiding this needs to improve the surface roughness. Processing a large spherical surface with high accuracy inevitably results in high cost. Further, in the direction of rotation, convexes contact each other, so that a large spin component is produced depending on the contact position, thus lowering the transmission efficiency. Structurally, this type is axially elongated, and cannot be mounted on FF vehicles. On the other hand, the metal belt type is in the form of a stack of a number of elements for easy bending, adapted to be pressed against a V-pulley to transmit torque. Basically, the pulley and the belt are in metal-to-metal contact, so that wear is unavoidable.

An object of the invention is to provide a traction drive type continuously variable transmission which has solved the above problems and which is capable of efficient transmission of large torque with size compaction.

The invention provides a traction drive type continuously variable transmission of novel construction, which is a transmission in the form of a combination of a coreless transmission ring and a V-pulley, the coreless ring being held from the outer periphery by guide rollers.

That is, according to an embodiment of the invention, the traction drive type continuously variable transmission comprises a first input/output shaft rotatably supported by a casing, a second input/output shaft rotatably supported by the casing, a V-pulley consisting of a pair of pulley members supported by the first input/output shaft and having a V-groove whose width is variable, a ring engaged with the V-pulley and supported around its outer periphery, and a mechanism for moving the ring around the axis of the second input/output shaft. As compared with the half toroidal type, the traction drive type continuously variable transmission of the invention has the following advantages. Even if the contact area is increased, the efficiency will be high with little spin component. No spherical processing as in the half toroidal type is required. The transmission is shorter in axial length than in the half toroidal type and applicable to FF vehicles. Further, as compared with the metal belt type, it is simple in construction and has oil films formed in the interface to the pulley, and compared with the metal belt type, no wear is produced, so that it has a long life.

These and other objects and features of the invention will become more apparent from the following description with reference to the drawings.

BRIEF DESCRIPTION OF THE DRAWINGS

FIG. 10b is an enlarged view of an area b of FIG. 10a;

BEST MODE FOR EMBODYING THE INVENTION

Embodiments of the invention will now be described with reference to the accompanying drawings.

Figure 2:
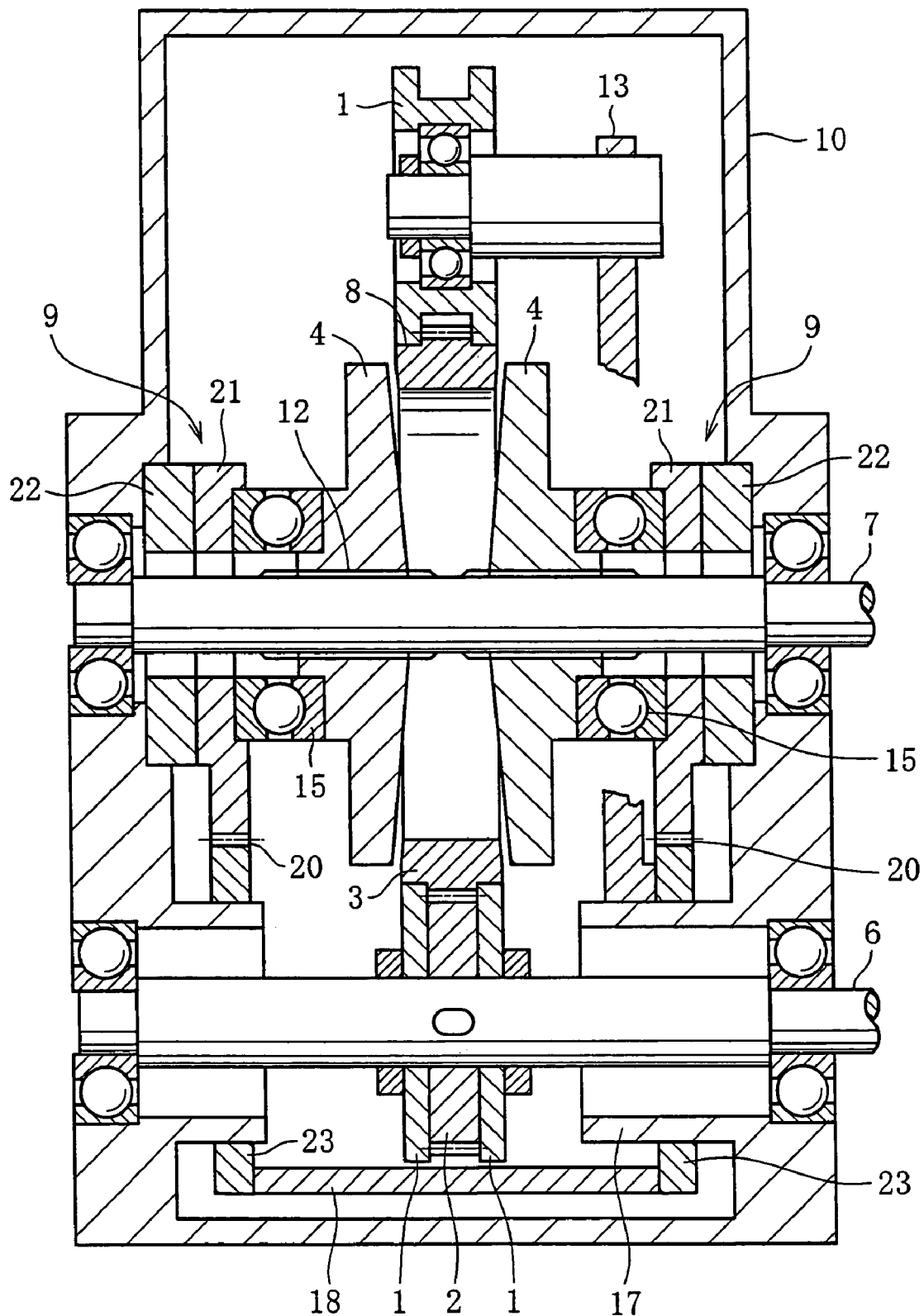
FIG. 2 is a sectional view of the traction drive type continuously variable transmission.

FIG. 2 is a sectional view of a traction drive type continuously variable transmission, showing an embodiment of the invention. As can be seen from the figure, it is of a construction in which a ring 3 is fitted in the groove of a V-pulley consisting of a pair of axially movable pulley members 4. In this embodiment, the ring 3 has gear teeth around its outer periphery; therefore, it will be hereinafter referred to as the toothed ring. As shown in FIG. 2, input/output shafts 6 and 7 which are parallel with each other are rotatably supported through their respective bearings in a casing 10. In this embodiment, torque transmission is effected between these two shafts 6 and 7, and their relation is such that if one shaft (6 or 7) is an input shaft, the other shaft (7 or 6) becomes an output shaft.

Figure 1:
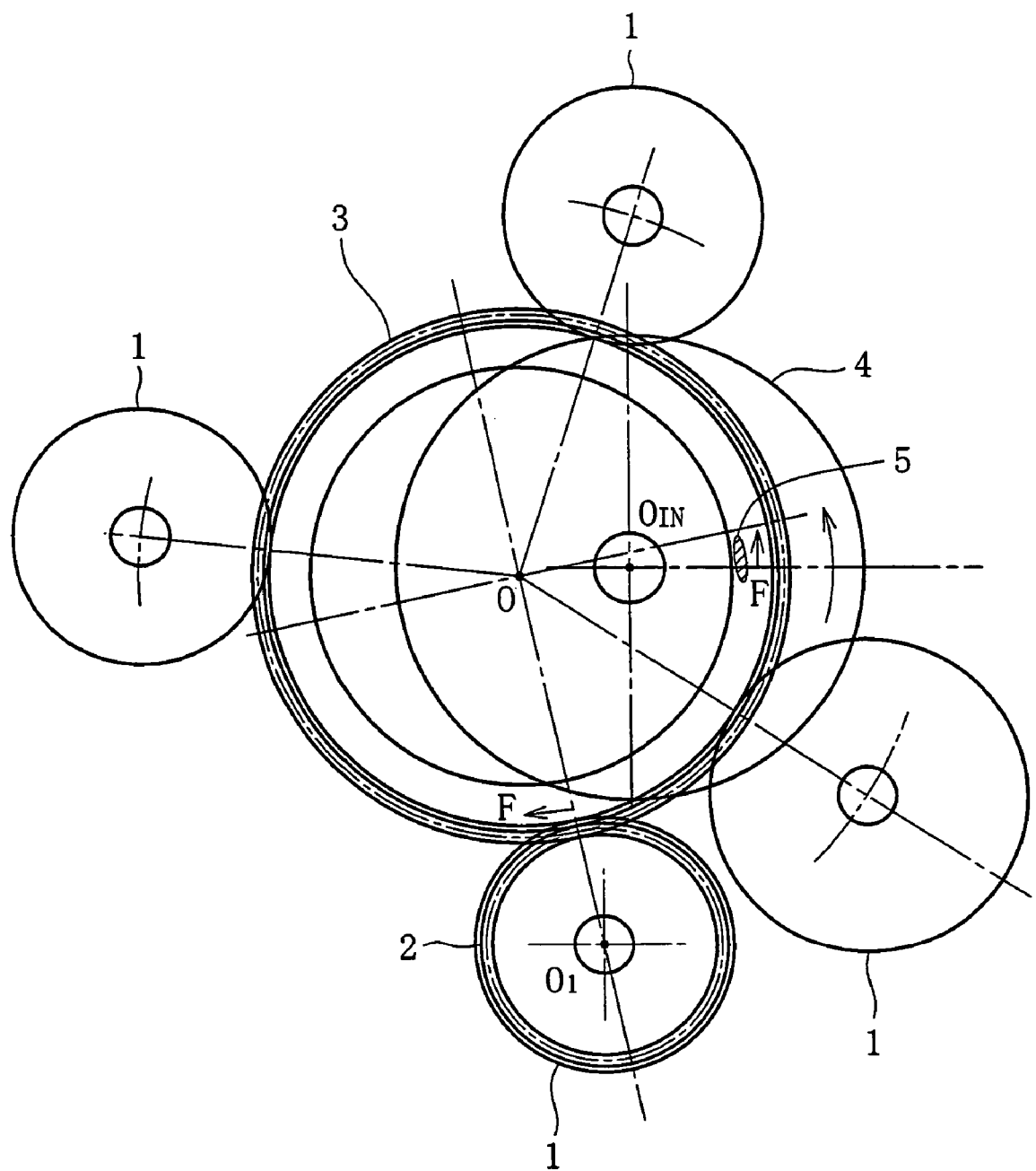
FIG. 1 is a conceptual view of a traction drive type continuously variable transmission.

The first input/output shaft 6 has an input/output gear 2 fixed thereto. The input/output gear 2 is in mesh with the toothed ring 3. The sectional shape defined by the lateral surfaces of the toothed ring 3 substantially coincides with that of the groove of the V-pulley 4. The toothed ring 3 has teeth for meshing with the teeth of the input/output gear 2, and a smooth cylindrical guide surface 8, at which it is contacted with a guide roller 1. As guides for the toothed ring 3, since the load of contact with the toothed ring 3 is low, employment may be made, in addition to the guide roller 1 adapted to roll in contact with the outer peripheral surface of the toothed ring 3 as shown, of a slide bearing (shoe) adapted for slide contact with the toothed ring 3. As shown in FIG. 1, four guide rollers are 1 are installed in this embodiment; in FIG. 2, two guide rollers, that is, the guide rollers constituted by a pair of disks disposed on opposite sides of the input/output gear 2, and the guide roller disposed in the top in FIG. 1 are shown in section. The guide rollers constituted by a pair of disks disposed on opposite sides of the input/output gear 2 are rotatably fixed to the input/output shaft 6. The rest of the guide rollers 1 are rotatably supported by an arm 13. Therefore, the positional relation between the guide rollers 1 is a fixed relation. Of these guide rollers 1, the one appearing at the left end of FIG. 1 is given the role of preventing axial sway of the toothed ring 3. The arm 13 is turnably supported coaxially with the input/output shaft 6 by the sleeve 17 of the casing 10.

The second input/output shaft 7 has a spline shaft section 12, on which a pair of pulley members 4 are spline-fitted. The pulley members 4 are movable axially of the input/output shaft 7. Each pulley member 4 has a groove width adjusting mechanism 9. The groove width adjusting mechanism 9 includes a pair of face cams 21 and 22 supported coaxially with the input/output shaft, and a thrust bearing 15. Of the pair of face cams, the movable cam 21 is movable axially of the input/output shaft and contacted with the pulley member 4 through the thrust bearing. The fixed face cam 22 is fixed to the casing 10.

Figure 3B:
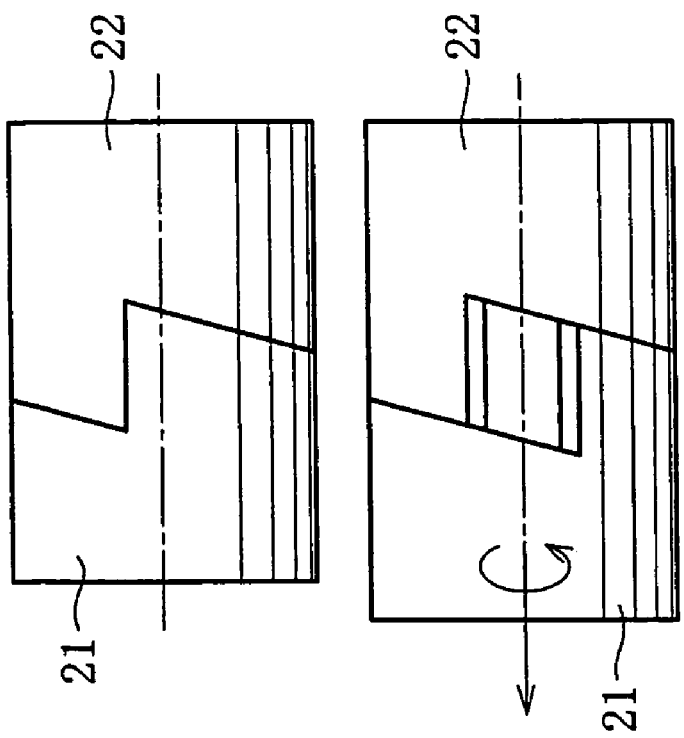
FIG. 3b is side view showing the operating procedures of the face clutch.
Figure 3A:
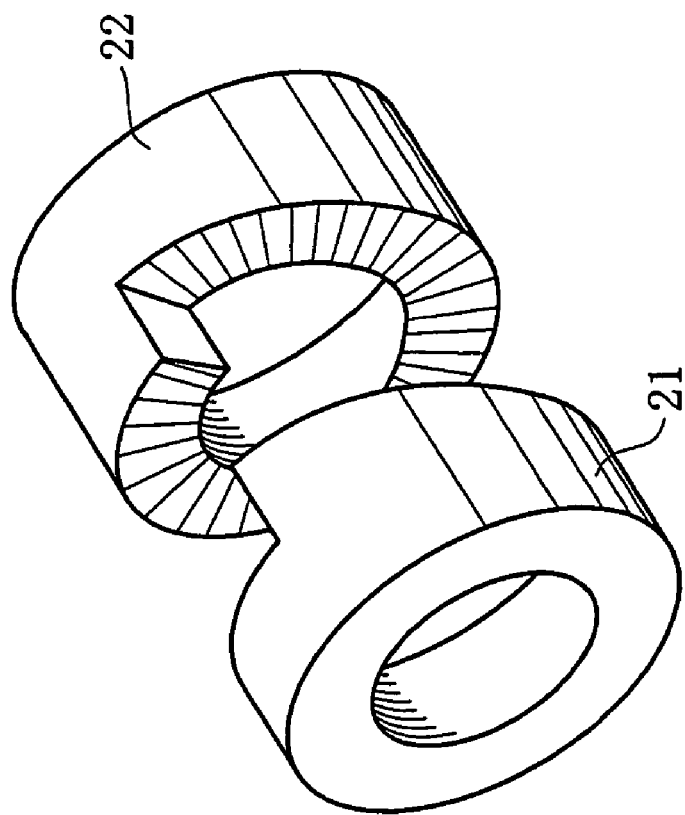
FIG. 3a is an exploded perspective view illustrating a face clutch.
Figure 4:
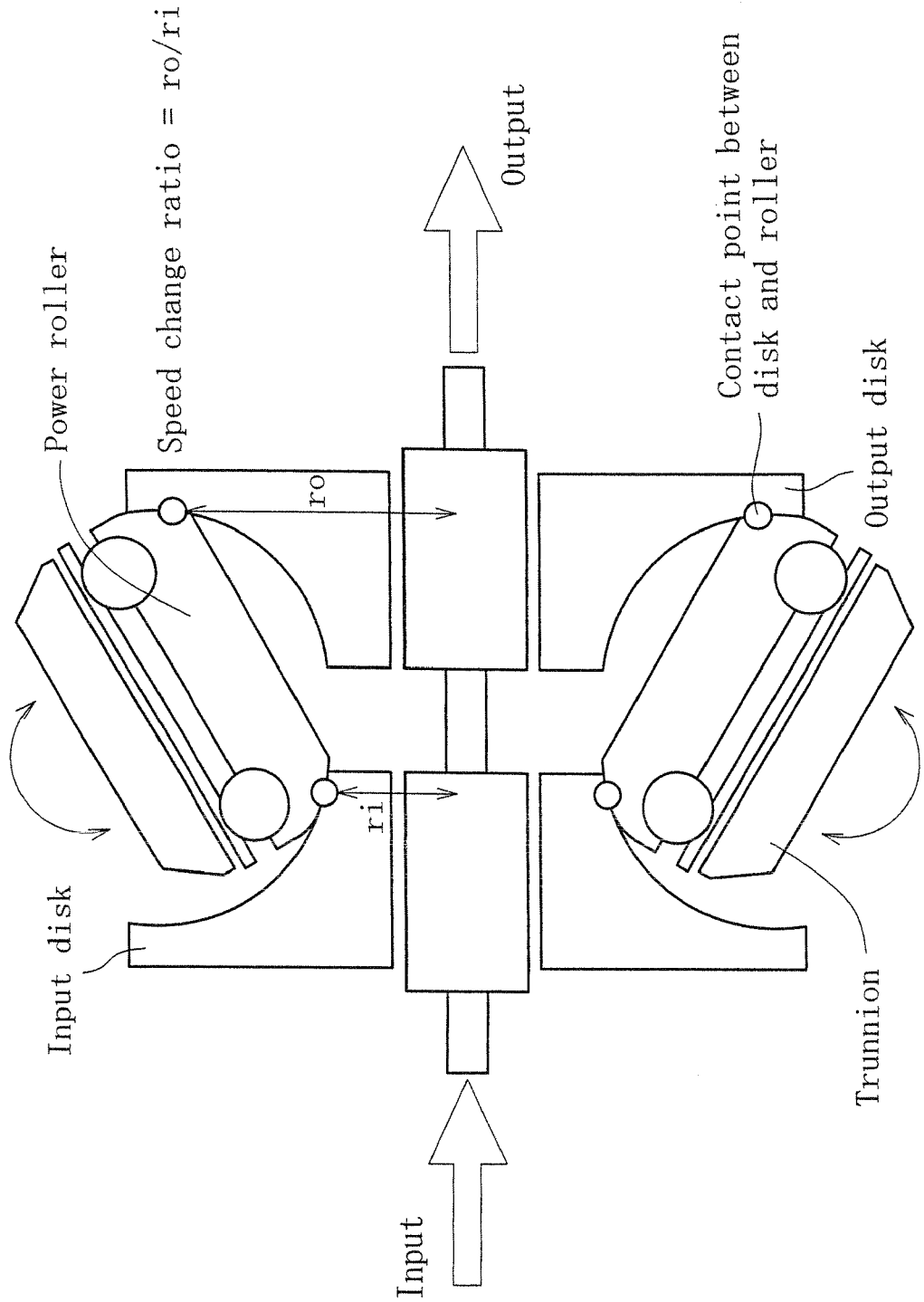
FIG. 4 is a sectional view showing the prior art.
Figure 5B:
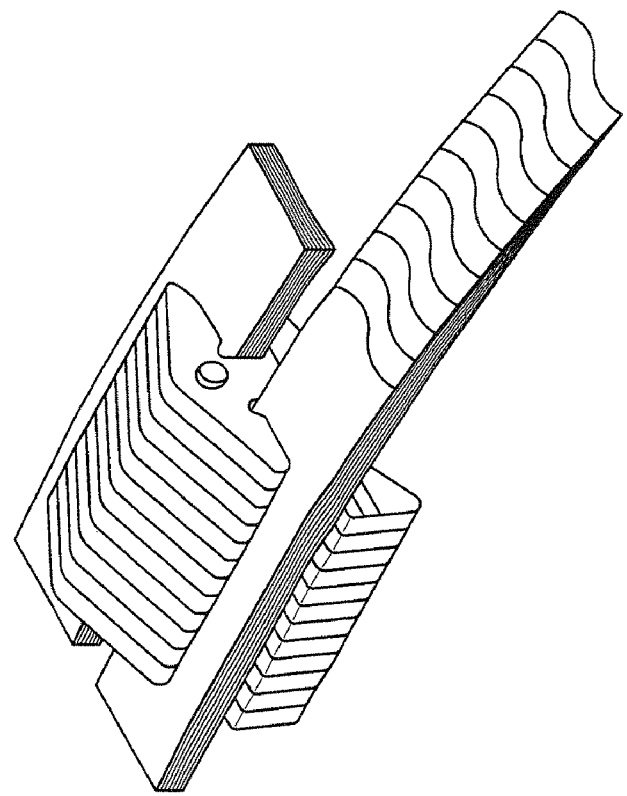
FIG. 5b is a perspective view showing the prior art.
Figure 5A:
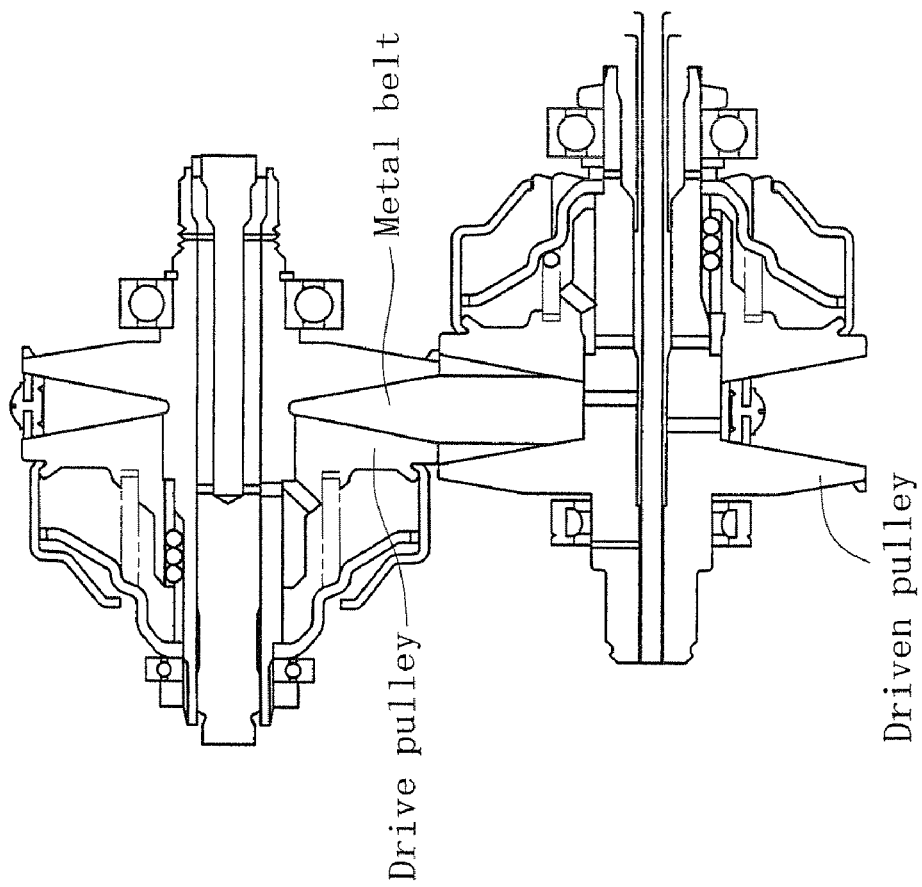
FIG. 5a is a sectional view showing the prior art.

The pair of face cams are contacted with each other through slopes such that relative rotation provides movement toward or away from each other. Interposing balls between the inclined surfaces will smooth the movement. The face cams illustrated in FIGS. 3a and 3b contact each other through spiral slopes so that when rotated, the movable face cam 21 moves toward or away from the fixed face cam 22. Thus, as the movable face cams 21 are rotated, they allow the pulley members 4 to move toward each other or away from each other through the thrust bearings 15, depending on the direction of rotation.

Gears 23 are fixed to the arm 13 and supported coaxially with the turning shaft of the arm 13. Further, the movable face cam 21 has teeth on the outer periphery, meshing with the gear 23 in a meshing section denoted by the reference character 20 in FIG. 2. Therefore, the movable face cam 21 rotates inoperative association with the turning of the arm 13. The gear 23 which is disposed on the sleeve 17 in the casing 10 and which rotates in operative association with the turning of the arm 13, transmits rotational force to the right and left movable face cams 21 through the meshing sections 20. This action causes the group of guide rollers 1 to turn around the center $O_1$ in operative association with the axial movement of the pulley members 4, moving the contact point while contacting the toothed ring 3 with the pulley members 4.

The pair of gears 23 are integrated together by a connecting section 18. Therefore, the pair of gears 23 rotate only in synchronism. As a result, the movable face cams 21 in the right and left groove width adjusting mechanisms 9 in FIG. 2 turn in the same direction. The disposition of the face cams 21 and 22 of the groove width adjusting mechanism 9 on the right side is reverse to that of the face cams 21 and 22 of the groove width adjusting mechanism 9 on the left side. Therefore, when the movable face cams 21 rotate in the same direction, they are moved in opposite directions. In this manner, the pair of pulley members 4 move toward or away from each other to change the groove width.

Since the toothed ring 3 is restrained from the outer periphery by the three or more guide rollers 1, it can be rotated even without a central shaft, (coreless roller). The guide rollers 1 are connected by the arm 13, so that by turning the arm 13 the center of rotation of the toothed ring 3 can be moved around the center $O_1$. Therefore, the teeth cut in the outer periphery of the toothed ring 3 are always in mesh with the teeth of the input/output gear 2. If the pulley members 4 and the arm 13 are controlled so that there is no clearance produced between the toothed ring 3 and the pulley members 4, movement of the toothed ring 3 around the center $O_1$ changes the contact point between it and the pulley members 4; thus, the speed of the pulley members 4 can be continuously varied with respect to a given number of revolutions of the input/output gear 2. In this manner, the so-called CVT is constructed.

If the input/output shaft 7 supporting the pulley members 4 is used as an input shaft, the pressed-in state of the toothed ring 3 is a speed reduction state. If the transmission torque is the same, the clamping force due to the pulley members 4 with the toothed ring 3 pressed in should be large, and reversely it may be small if the contact point between the toothed ring 3 and the pulley members 4 is on the larger diameter side. When the bending stresses in the pulley members 4 due to the clamping force are considered, this method capable of reducing the clamping force, and this method in which the pulley members 4 is used for input is better than a method in which they are used for output.

When a rotational force is inputted from the pulley members 4 in the direction of arrow of FIG. 1, a force F acts from the pulley members 4 to the toothed ring 3, and substantially the same size of force acts from the input/output gear 2. Since the reaction from the input/output gear 2 acts in the direction to press the ring 3 into between the pulley members 4, the contact force automatically increases with increasing transmission torque.

Figure 6:
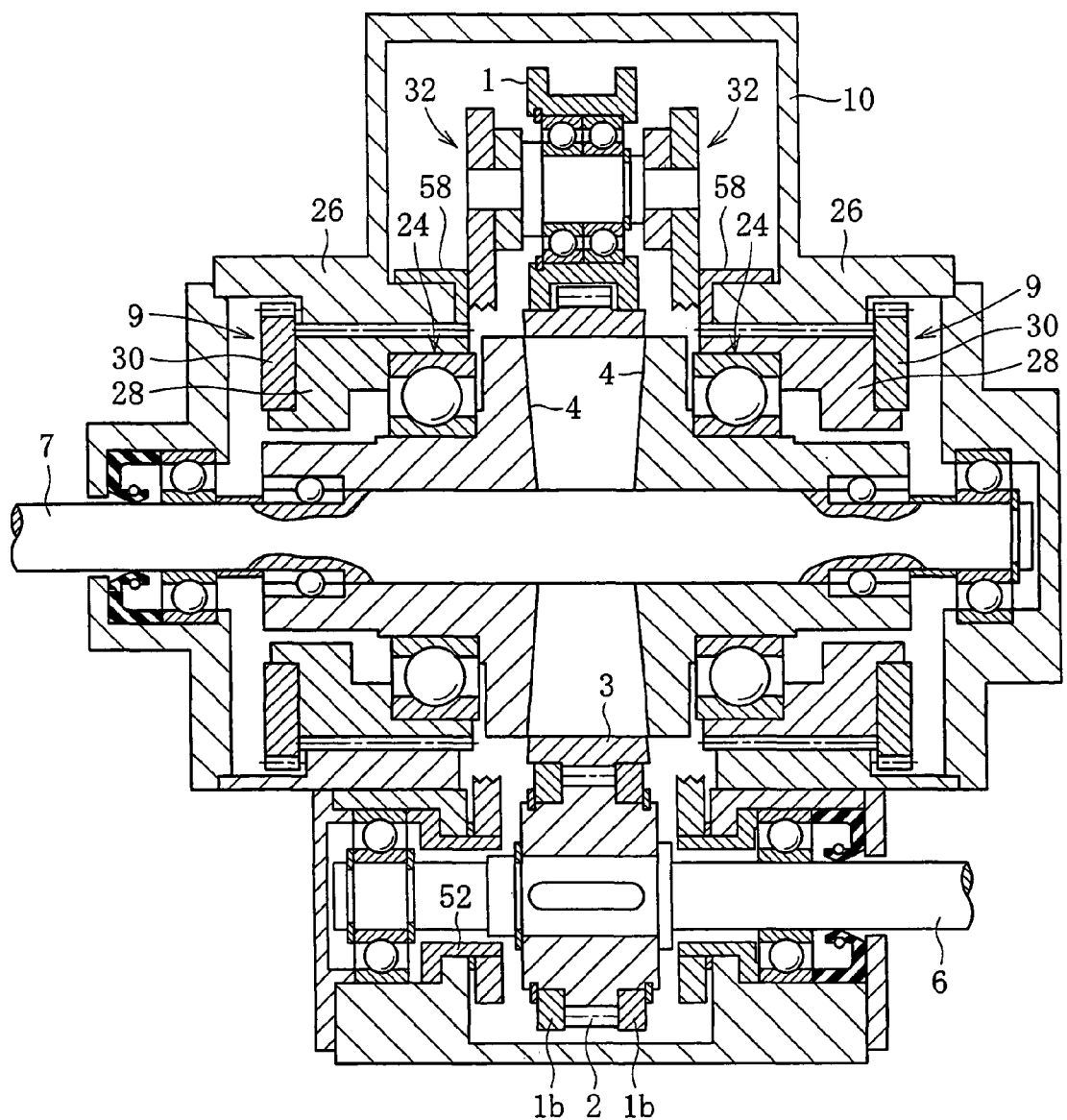
FIG. 6 is a longitudinal sectional view showing an embodiment of the invention.

An embodiment shown in FIG. 6 will now be described. In the embodiment in FIG. 2, the pulley members 4 are supported by the thrust ball bearings 15. However, since radial loads act on the pulley members 4, a large bending moment will act on the shaft 7. To avoid this, it is desirable to employ bearings that are capable of supporting both radial loads and thrust loads, such as deep groove ball bearings, angular contact ball bearings or tapered roller bearings. FIG. 6 shows an embodiment employing deep groove ball bearings. The inner ring of a ball bearing 24 is attached to the vicinity of the slope of a pulley member 4, while the outer ring is attached to a feed screw shaft 28. The feed screw shaft 28 has a male thread, such as a trapezoidal thread, cut thereon, while a casing 10 is formed with a nut 26 having a female thread cut therein. These threads mesh with each other, forming a mechanism for converting rotational motion of the feed shaft 28 into linear motion. It is designed that the radial play produced in the feed screw shaft 28 is so small as to enable radial loads on the pulley members 4 to be supported with high rigidity. The use of ball screws for the feed screw shaft 28 suits the present use because of their low rotational resistance. In FIG. 6, although the nut 26 having cut therein a female thread which meshes with the male thread of the feed screw 28 is depicted to be integral with the casing 10, it may be a separate body, in which case the function is the same. Aluminum alloy is used for the casing 10 and in the case of a ball screw, the thread section is a separate body, and a hard material is used therefor.

A gear 30 is attached to the feed screw shaft 28. And, the feed screw shaft 28 is rotationally driven through the gear 30 by an unillustrated driving means. The right and left feed screw shafts 28 symmetrically operate to change the spaced distance (groove width) between the pair of pulley members 4, with the result that the speed change ratio is changed. That is, the rotation of the feed screw shafts 28 does not change the central positions of the pulley members 4 but changes the groove width alone. Thus, the feed screw shafts 28 correspond to the previously mentioned pulley width adjusting mechanisms 9 in that the feed screw shafts 28 change the groove width of the pair of pulley members 4 by their axial movement. In addition, common steel balls are interposed between the pulley members 4 and the shaft 7 to allow smooth axial relative movement, while a whirl-stop is provided in the direction of rotation.

Figure 7:
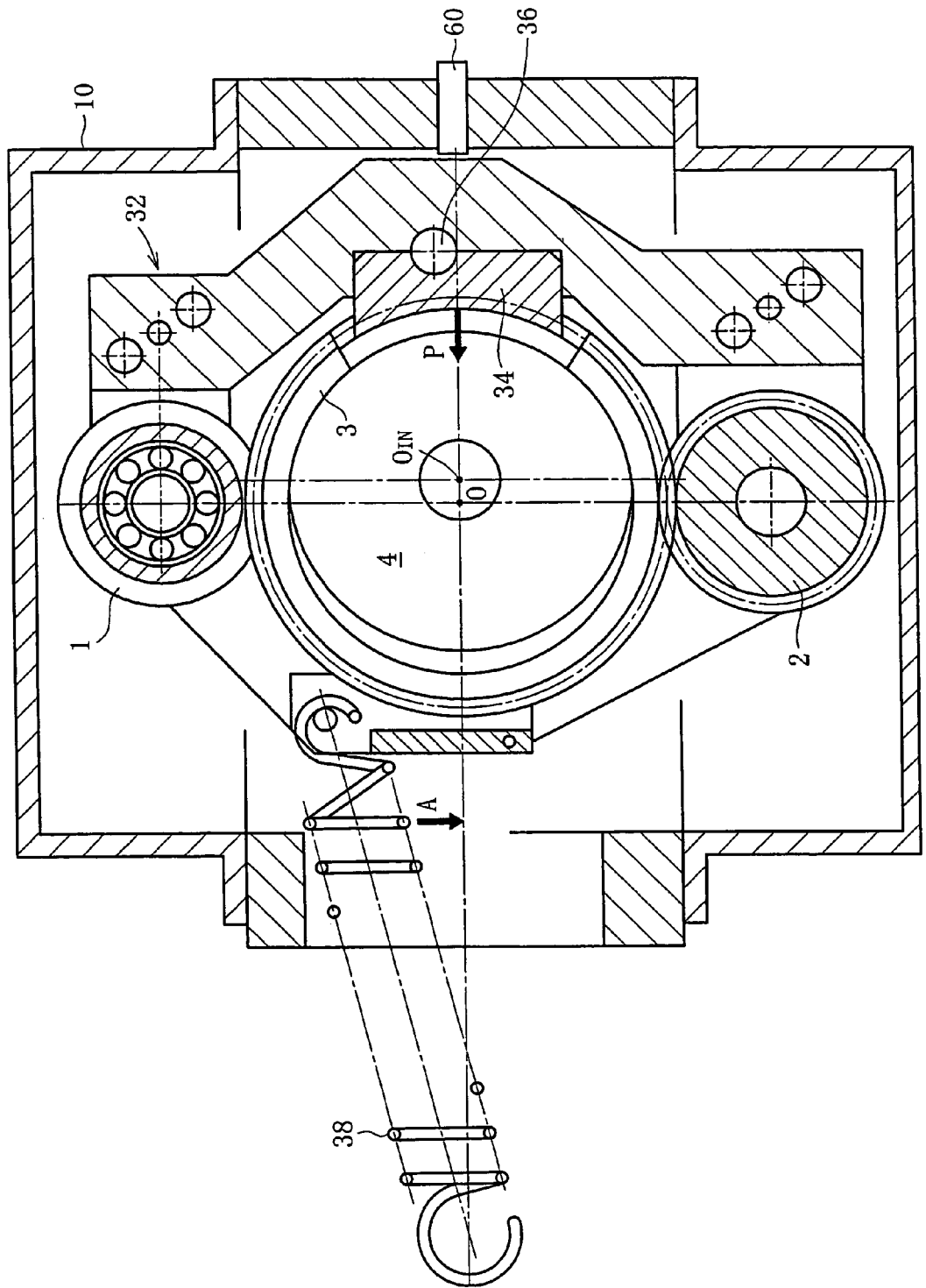
FIG. 7 is a cross sectional view showing the embodiment of the invention.
Figure 8:
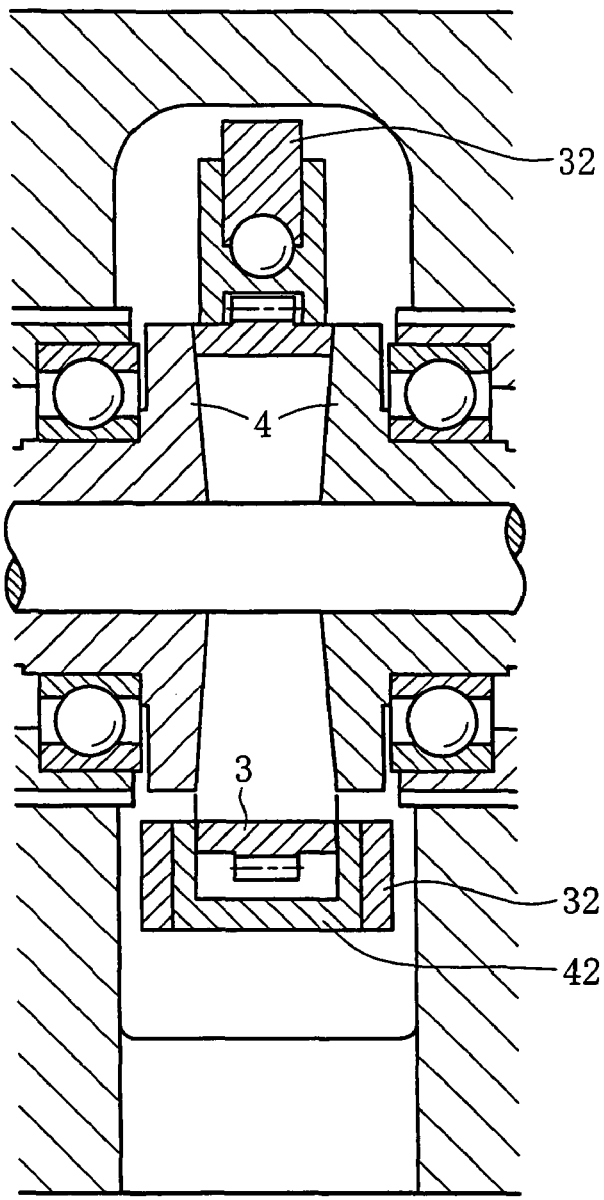
FIG. 8 is a longitudinal sectional view showing a width guide.

As shown in FIG. 7, the toothed ring 3 is supported by a speed change arm mechanism 32 and is pressed against the pulley members 4 through a controlled force P. The arm mechanism 32 comprises guide rollers consisting of disks 1b disposed on opposite sides of the output gear 2, a guide roller 1 supported through a rolling bearing in a position where it is diametrically opposed to the first-mentioned guide rollers, and a shoe guide 34 appearing on the right side in the figure in a direction orthogonal to them, the central position of the toothed ring 3 being restrained by them. The positions of these guide rollers are by way of example, and it is not absolutely necessary that they be positioned at an angle of 90 degrees. Further, the relation between the central position of the toothed ring determined by the three guide rollers and the central positions of the pulley members 4 is not absolutely the same as the relation of FIG. 7. Further, the axial positioning of the arm mechanism 32 is effected by a pair of arm guides 58. Further, as shown in FIG. 8, a width guide 42 may be provided for suppressing axial swing of the toothed ring 3. As can be understood from FIG. 6, the guide roller 1 is supported by a double row ball bearing.

Figure 9:
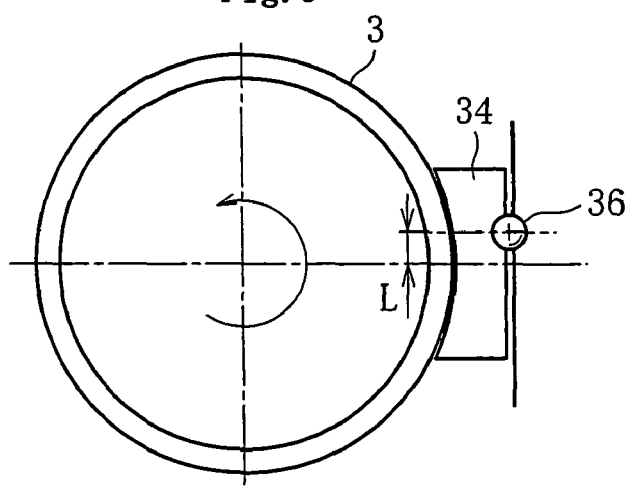
FIG. 9 is a sectional view of a tilting pad bearing.

As for control methods for the force P, most simply, as FIG. 7 is the case with this, there is a method using spring force; however, besides this, there is another method using oil pressure or a motor (including linear motor). The latter method is capable of finely controlling the force P. In FIG. 7, the reference character 38 denotes a tension coiled spring. The shoe guide 32 is attached to the arm mechanism 32 through an aligning member 36. This is intended to absorb the accuracy error between the two guide surfaces of the toothed ring 3. FIG. 9 shows an example in which the disposition of the aligning member 36 provides a tilting pad bearing. As denoted by the reference character L in FIG. 9, the shoe guide center is offset from the aligning member center (fulcrum) so that the center of pressure distribution in the bearing clearance is decentered, thereby improving the load capacity of the shoe guide 34.

Figure 10A:
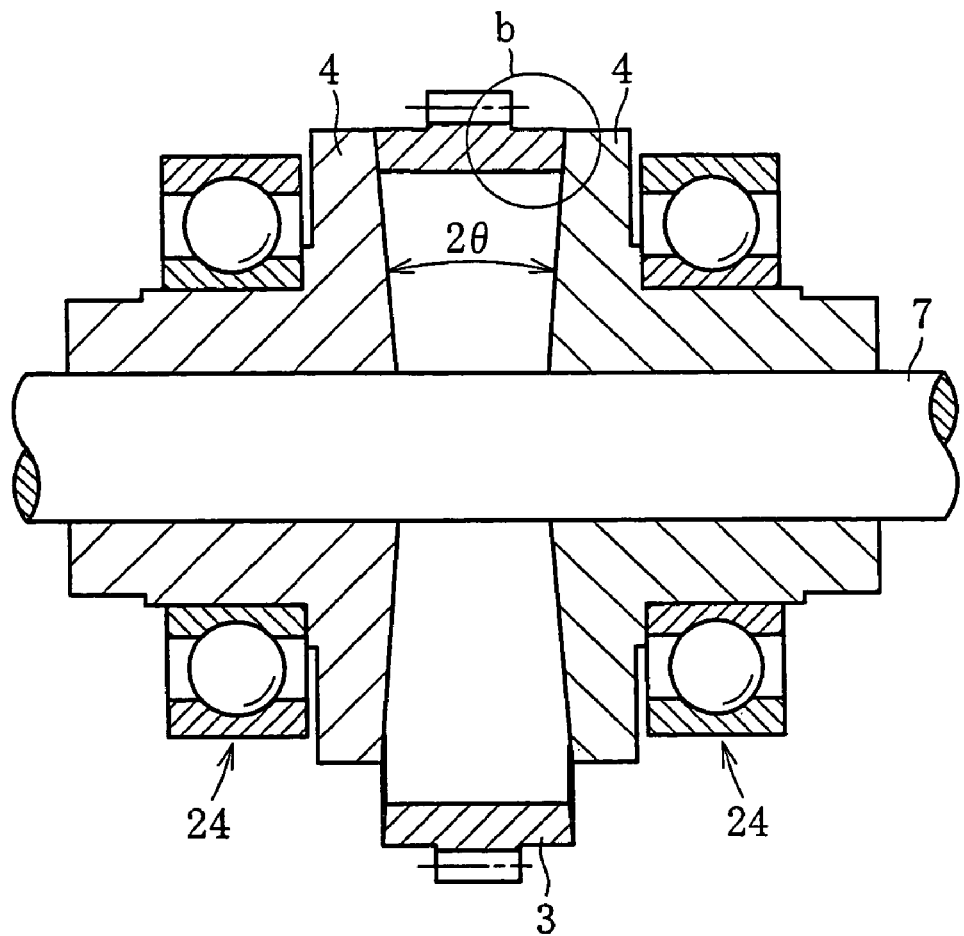
FIG. 10a is a longitudinal sectional view of the tilting pad bearing.
Figure 10B:
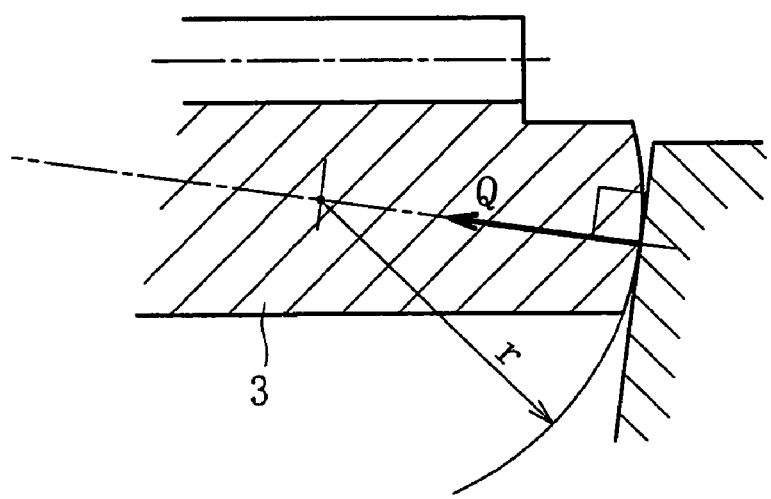

The contact region between the toothed ring 3 and the pulley members 4 assumes a high surface pressure. Therefore, if an edge load is produced, this will result in early peeling. As measures against this, it is preferable to give an auxiliary curvature having a radius of curvature r to the toothed ring 3, as shown in FIGS. 10a and 10b. A larger radius of curvature r lowers the contact surface pressure for the same contact force, avoiding the lowering of life. However, the spin component increases, incurring the lowering of transmission efficiency. Accordingly, as a criterion, it is suitable to determine the auxiliary curvature such that a surface pressure of 3.5-4.5 GPa is obtained during actuation of the maximum transmission torque. Further, the traction section is under high surface pressure and is acted on by linear force. Material compositions for obtaining long life under such conditions have been variously studied, and the toroidal type development results can be utilized. Generally, carburized steel is used, but hydrogen brittleness must be taken into account. Naturally, for surface hardness and hardness distribution, the same design technology as that for bearings will be used. As for hardness, HRC 66 or thereabout is preferable. It is preferable that the surface have a compression stress of 200 MPa or above.

Figure 11:
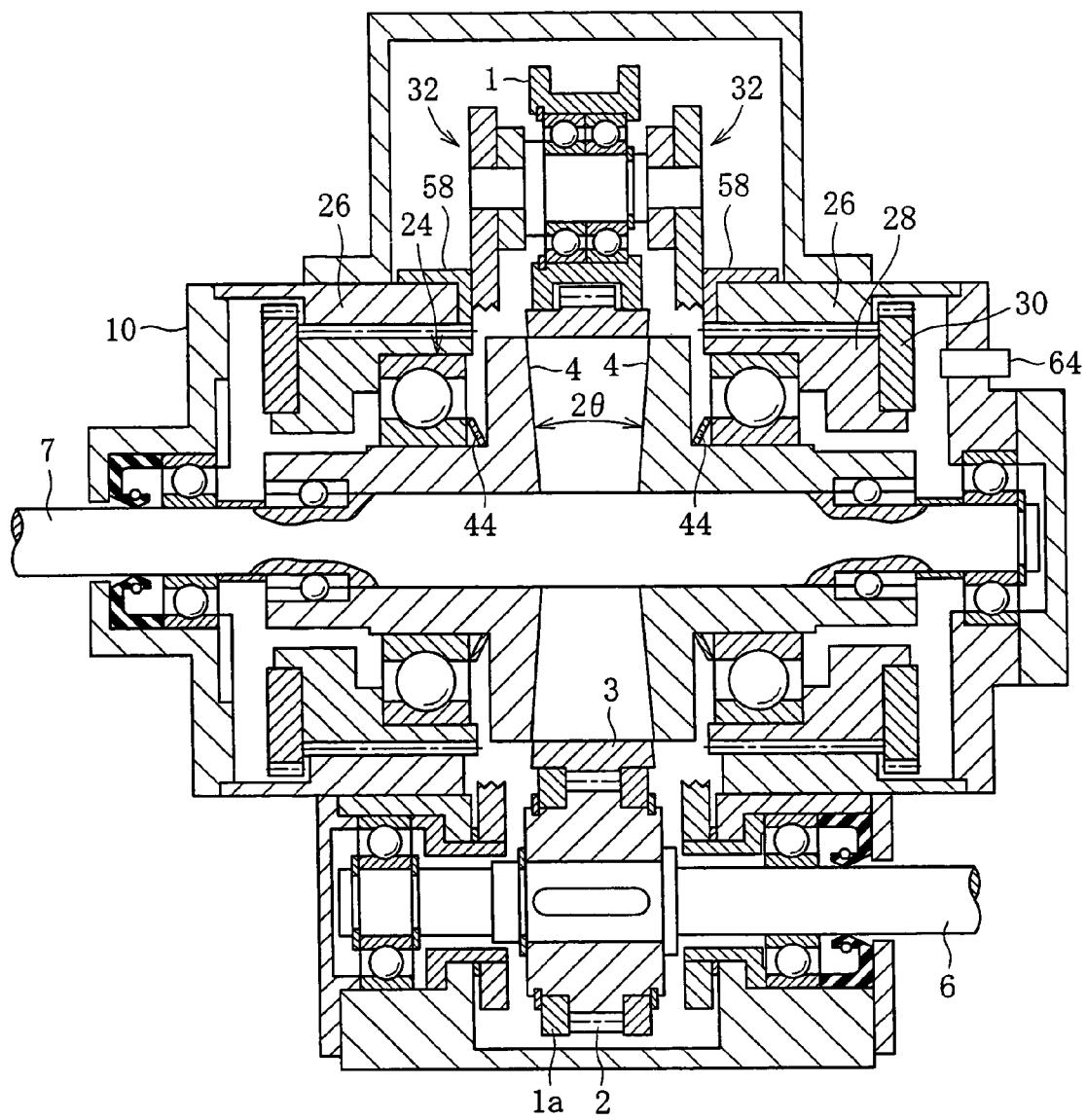
FIG. 11 is a longitudinal sectional view showing a modification using an elastic member.

As shown in FIG. 11, an elastic member 44 may be interposed between the pulley member 4 and the end surface of the inner ring of the support bearing 24. Though not shown, it may also be interposed between the screw shaft 28 and the end surface of the outer ring of the support bearing 24. In short, the elastic member 44 is disposed in the axial clearance between the pulley member 4 and the feed screw shaft 28. FIG. 11 illustrates a case where a Belleville spring is employed as the elastic member 44. In the case where when an automobile having the present traction drive type continuously variable transmission mounted thereon is traveling at a given speed, the accelerator pedal is stepped on, acceleration after shift-down is ideal; however, there is a delay produced before the transmission responds thereto. It is the elastic member 44 that performs the role of eliminating this delay. In this sense, the elastic member 44 may be referred to as the response improving spring. When the automobile is accelerated from its steady-state travel, the toothed ring 3 has instantaneously increased therein the pressing force by which it is pressed into the pulley members 4. Thereby, a compressive force acts on the elastic member 44, now slack, to deform the latter, so that the groove width of the pair of pulley members 4 increases. This means that a high speed-reduction ratio is instantaneously given, thus improving speed-change response. If the present traction drive type continuously variable transmission assumes a large speed change ratio, the radius of contact with the pulley members 4 will decrease, naturally leading to the lowering of torque. Though not shown, a couple of present traction drive type continuously variable transmissions connected in series will eliminate this drawback.

Installing a speed change ratio setting sensor 64 and measuring the position of the end surface of the gear 30 enables the groove width of the pulley members 4 to be indirectly measured. The groove width of the pulley members 4 is equivalent to the speed change ratio. Accordingly, signals from the sensor 64 indicate the speed change ratios, the speed change being realized by rotating the gear 30 by an unillustrated outside motor. To control the drive power of this outside motor, it is necessary to know a target seed change ratio and an actual speed change position.

Figure 12:
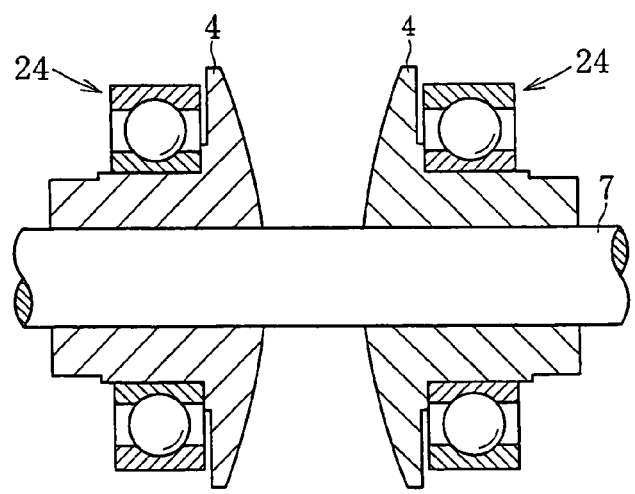
FIG. 12 is a longitudinal sectional view showing a modification of a pulley member.

It is clear that the lubricating oil used for traction drive exhibits a high traction coefficient. If the contact surface pressure lowers, the traction coefficient also lowers. For this reason, it is necessary to maintain a minimum contact surface pressure. In the case where the angle θ of the pulley members 4 is constant, if the position of contact with the toothed ring 3 approaches the outer diameter of the pulley members 4, the peripheral length of the contact region increases and the contact surface pressure lowers. To avoid this, it is recommendable to change the angle of the pulley members 4 as shown in FIG. 12. It is recommendable to give 1 GPa as a minimum surface pressure. This value also changes in relation to the pressing force P.

Figure 13:
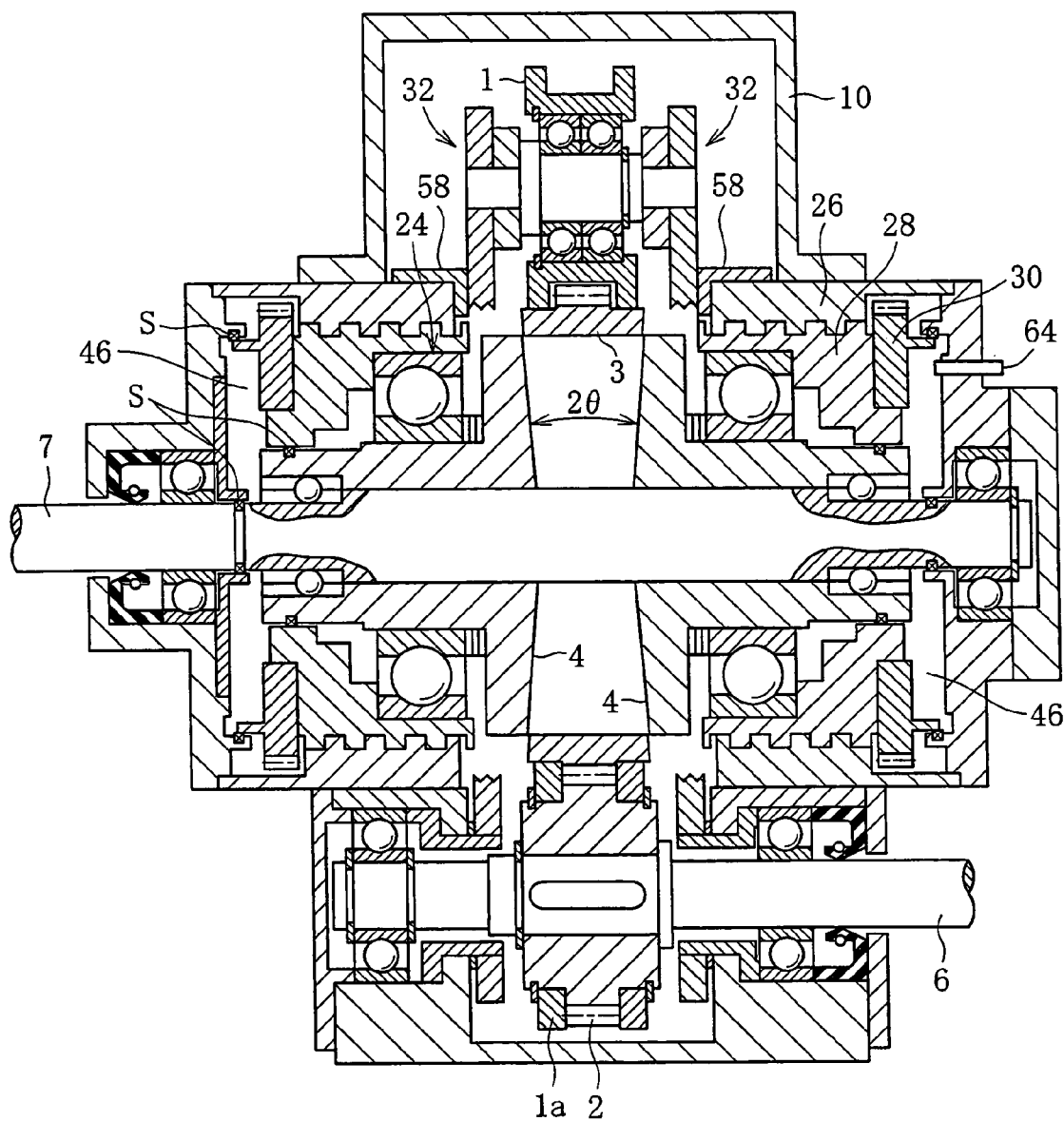
FIG. 13 is a longitudinal sectional view showing another embodiment.

Next, an embodiment shown in FIGS. 13 and 14 will be described. The spaced distance (groove width) between the pair of pulley members 4 is determined by the right and left feed screw shafts 28. If the feed screw shafts 28 are actuated under the action of high torque and in the direction to reduce the speed change ratio, the drive torque for the feed screw shafts 28 is also high. To lower the drive torque by using a ball screw, the load capacity of the ball screw has to be increased. The screw diameter or the length would be increased. Further, the drive motor is required to deliver a high torque, leading to upsizing.

The end surfaces of the pulley member 4 and feed screw shaft 28 face a common oil pressure chamber 46, which is sealed by a seal S. The lubricating oil used in the traction drive type continuously variable transmission is pressurized by a hydraulic pump and supplied to the right and left oil chambers 46. The pressure receiving area of the pulley member 4 is smaller than that of the feed screw shaft 28; therefore, this is less effective in reducing the load on the bearing is small but this is effective in reducing the thrust load between the feed screw shaft 28 and the nut 26. Further, this is also effective in downsizing the motor. To move the pulley members 4, the feed screws 28 are rotationally driven through the drive gears 30 by the gear device. At this time, the oil pressure supplied in such a manner that the drive power reduces is controlled. If an electric motor is used as a source for the drive power, the motor current is equivalent to torque and is easy to use for control.

Figure 14:
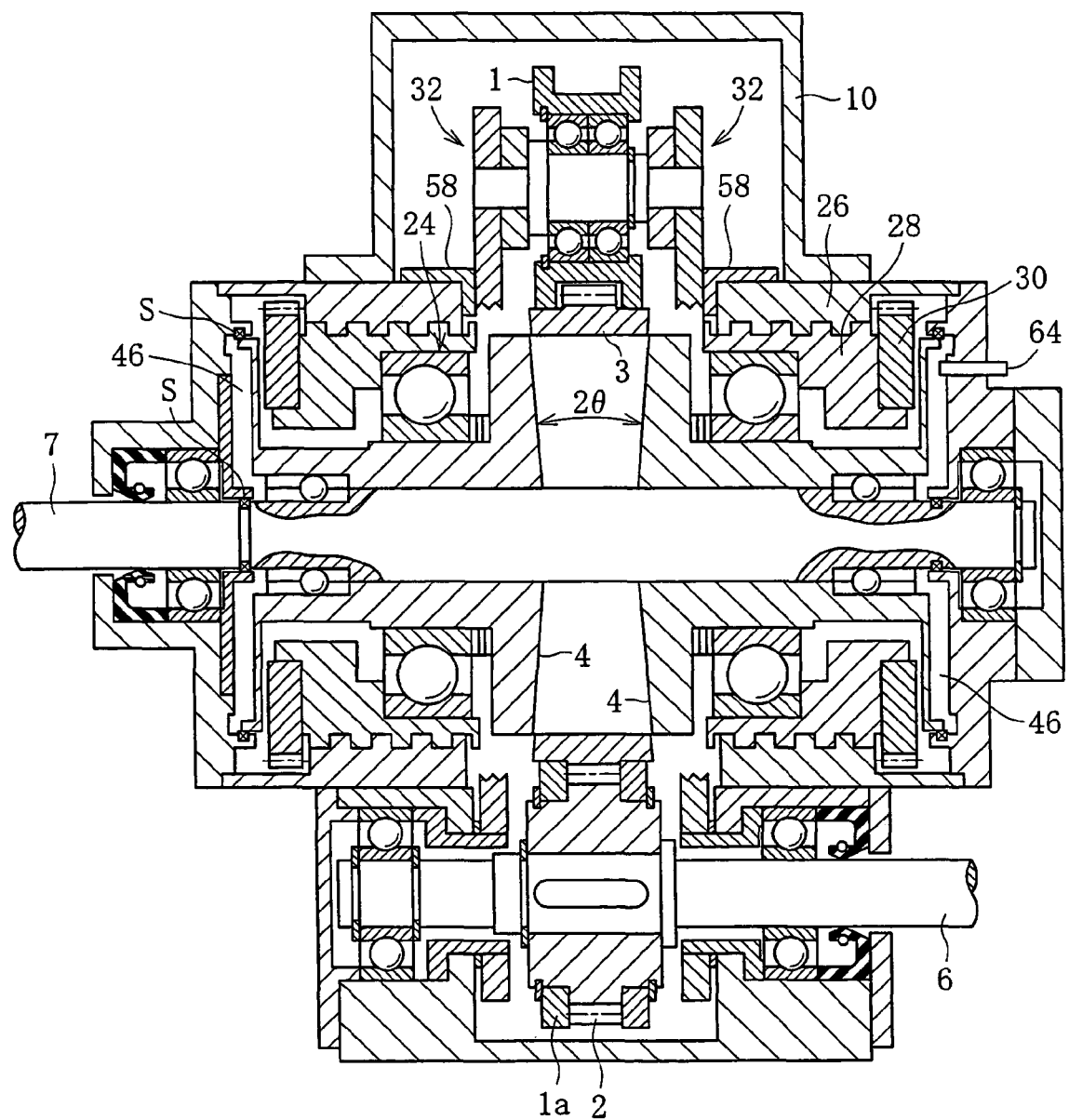
FIG. 14 is a longitudinal sectional view showing a modification.

FIG. 14 shows a modification in which the oil pressure force acts on the pulley members 4 alone. In this case, reduction of thrust load on both the bearings 24 and the feed screw shafts 28 is possible. However, if the oil pressure becomes too high, the position of the pulley members 4 is changed by the oil pressure force alone, complicating the oil pressure control.

The axial force acting on the pulley members 4 is determined by the transmission torque and speed change position of the traction drive type continuously variable transmission. At a high speed reduction position, the force with which the toothed ring 3 is pressed into between the pulley members 4 increase. The input torque is approximately proportional to the absolute pressure in the suction manifold of the engine. Accordingly, it is possible to calculate an optimum oil pressure by using the speed change position and suction pressure of the traction drive type continuously variable transmission obtained by the sensor 64.

Figure 15A:
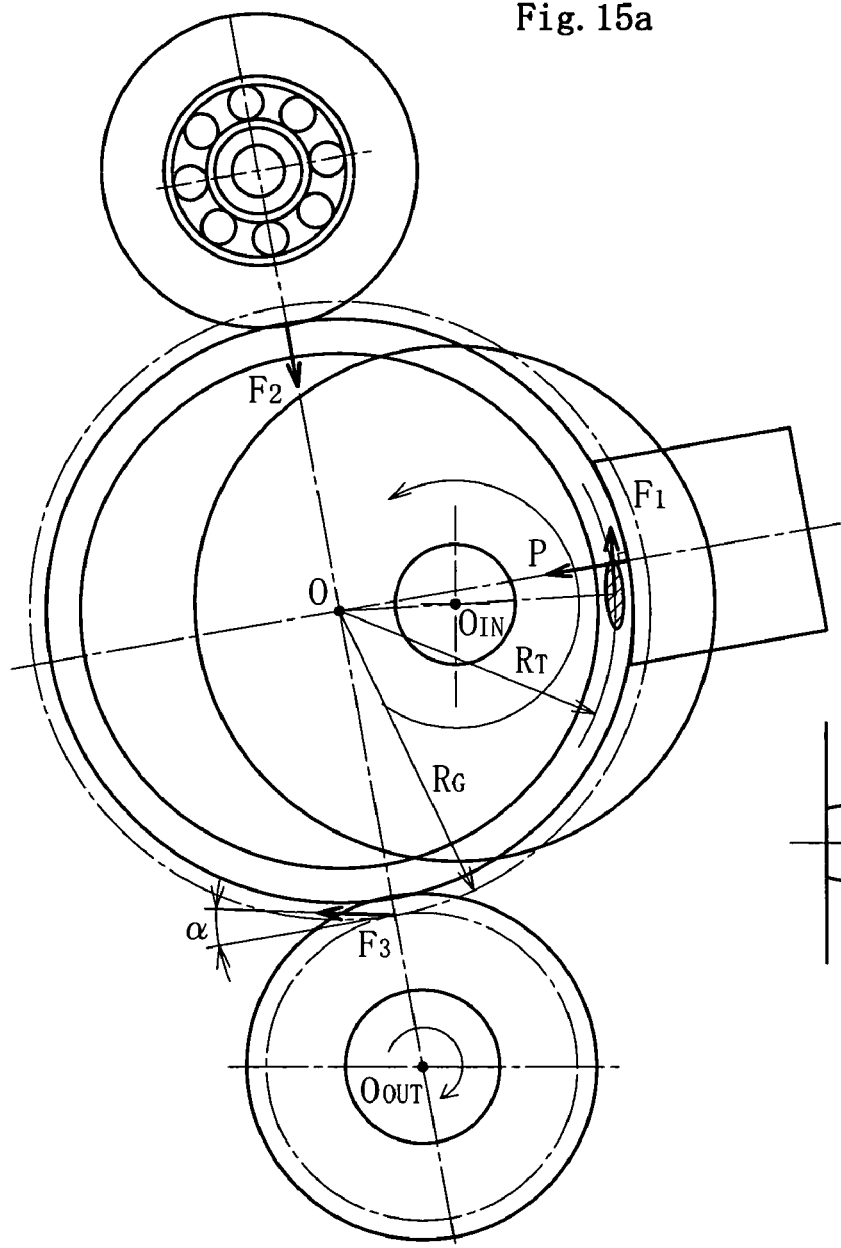
FIG. 15a is a conceptual view.
Figure 15B:
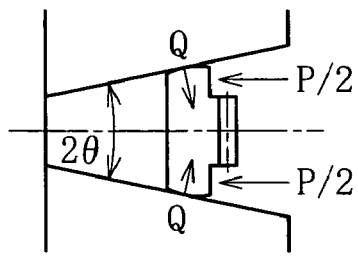
FIG. 15b is an enlarged sectional view.

FIGS. 15a and 15b are conceptual views similar to FIG. 1 of a traction drive type continuously variable transmission, diagrammatically showing the arrangement of FIG. 7. In the case of transmitting rotational force from the pulley members 4 to the toothed ring 3 in the direction shown in FIG. 7, it is possible to make a design such that a pressing force proportional to the transmission force is passively generated, as shown below. Main forces acting on the toothed ring 3 from the pulley members 4, output gear 2, and guide rollers 1 are as shown in FIGS. 15a and 15b. As for the transmission force F3 to the output gear, letting α (generally, 20 degrees) be the contact angle of the gear, and RT and RG be radii of the contact regions, respectively, Formula 1 is obtained from the balance of torque.

$$F_3 R_G \cos 20° = F_1 R_T \quad (1)$$

The force $P_{SUM}$ for pressing the toothed ring 3 into between the pulley members 4 is obtained from the pressing force from the guide rollers 1 and from Formula 1, where cos 20°≈1.

$$P_{SUM} = P + F_1 R_T / R_G \quad (2)$$

When the opening angle of the pulley members 4 is 2 θ, the contact force Q between the pulley members 4 and the toothed ring 3 due to $P_{SUM}$ is as given in Formula 3.

$$2Q \sin \theta = P_{SUM} \quad (3)$$

When the traction coefficient is μ, since 2Qμ=$F_1$, Formula 4 is obtained from Formulae 1, 2, and 3.

$$F_1 = \mu(P + F_1 R_T / R_G) / \sin \theta \quad (4)$$

Figure 16:
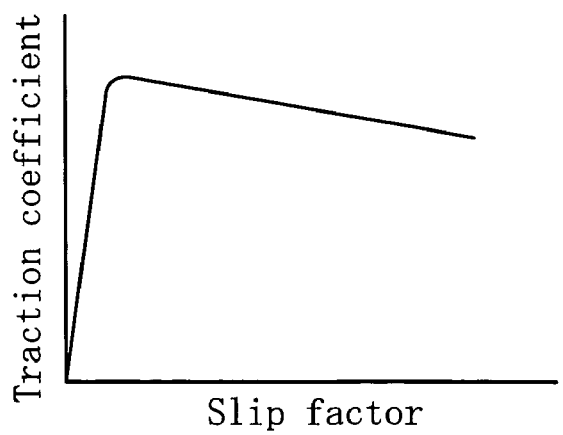
FIG. 16 is a graph showing the relation between traction coefficient and slip factor.

The traction coefficient changes with lubricating oil, temperature and slip factor. The relation between the slip factor and the traction coefficient is as shown in FIG. 16. With increasing slip factor, the traction coefficient increases until at some percentage, it reaches the maximum value $\mu_{MAX}$. The traction drive device is operated with a slip factor which provides the $P_{MAX}$ or with a less slip factor than that.

The clamping force exerted by the pulley members 4 changes in proportion to the transmission torque, a fact which is optimum for reduction of friction loss; therefore, an ideal state is that Formula 4 holds when P=0. Accordingly, from Formula 4, the optimum pulley angle is when the relation of Formula 5 holds. However, in this case, $\mu_{MAX}$ is employed as μ.

$$\sin \theta = \mu(R_T / R_G) \quad (5)$$

If the θ is too smaller than that given by the relation of Formula 5, the contact surface pressure rises more than is necessary, leading to the lowering of life and the increase of torque loss. Reversely, if it is too large, slip increases in the traction section, and torque loss increases.

Generally, while the maximum traction coefficient of lubricating oil changes with the kind and temperature of lubricating oil, a practical maximum value $\mu_{MAX}$ us in the range of 0.1-0.07 and 1>$R_T/R_G$>0.8 or thereabout. Therefore, from Formula 5, the angle μ of the pulley members 4 providing a clamping force proportional to transmission torque is 7-3 degrees.

In the case where the stepping on the accelerator pedal is released or where the vehicle speed has increased, the drive force (F3) decreases. At this time, if the pulley member 4 are moved in the direction to narrow the groove width (shift up), the Q increases to press the toothed ring 3 outward to the outer periphery of the pulley members 4, with the speed reduction ratio shifting in the direction to decrease.

The toothed ring 3 is held by at least three guide rollers 1. It is necessary for the guide rollers 1 to keep the toothed ring 3 pressed against the pulley members 4 with a minimum force. The reason is that when the transmission torque is zero, the toothed ring 3 becomes unstable. As this pressing method, the use of spring force, oil pressure or electromagnetic force (motor or the like) is contemplated. In the case where the present traction drive type continuously variable transmission is applied to an automobile, it has been shown that self-preloading is possible during driving by properly designing the angle of the pulley members 4. During engine braking, however, the force acting from the output gear 2 to the toothed ring 3 acts in a direction away from the pulley members 4. Since this force changes mainly according to the speed change position, it is controlled by another control mechanism during application of engine braking.

During application of engine braking, the force acting from the output gear 2 to the toothed ring 2 acts in a direction away from the pulley members 4. The magnitude is 1/B of the maximum value during driving, B being 5-10. During application of engine braking, a pressing force twice said value has to be generated by oil pressure or another mechanism. That is, in Formula 4, if $P \approx 2F_1R_T/BR_G$ and $R_T \approx R_G$, then $P=2F_1/B$. The $F_1$ changes according to the speed change position and increases on the high reduction-speed side.

When the speed change ratio is in the D range, this means that engine braking is not positively demanded. Accordingly, employed as the value of P at this time is $F_1$ at a position where the speed change ratio corresponds to the top.

When positive engine braking is demanded, for example, when the engine is shifted to the third or second gear, P due to the speed change lever position will be added.

Consider the case where a maximum torque of 200 Nm is inputted into the present traction drive type continuously variable transmission. If $R_T=100$ mm, then $F_1=2,000$ N. If B=10 and $R_T \approx R_G$, then $P=2,000 \times 0.2 = 400$ N.

Figure 17:
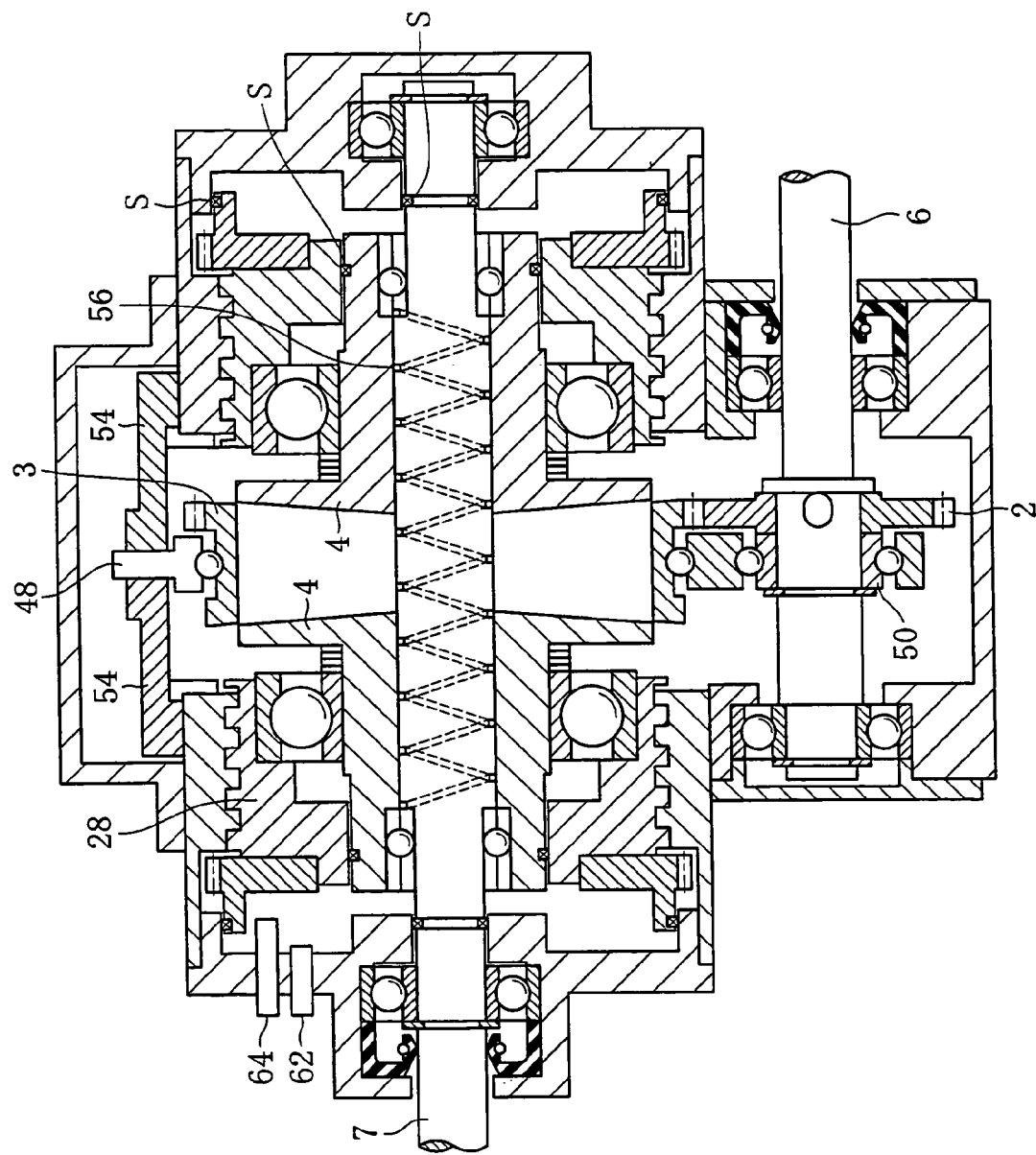
FIG. 17 is a longitudinal sectional view showing another embodiment.
Figure 18:
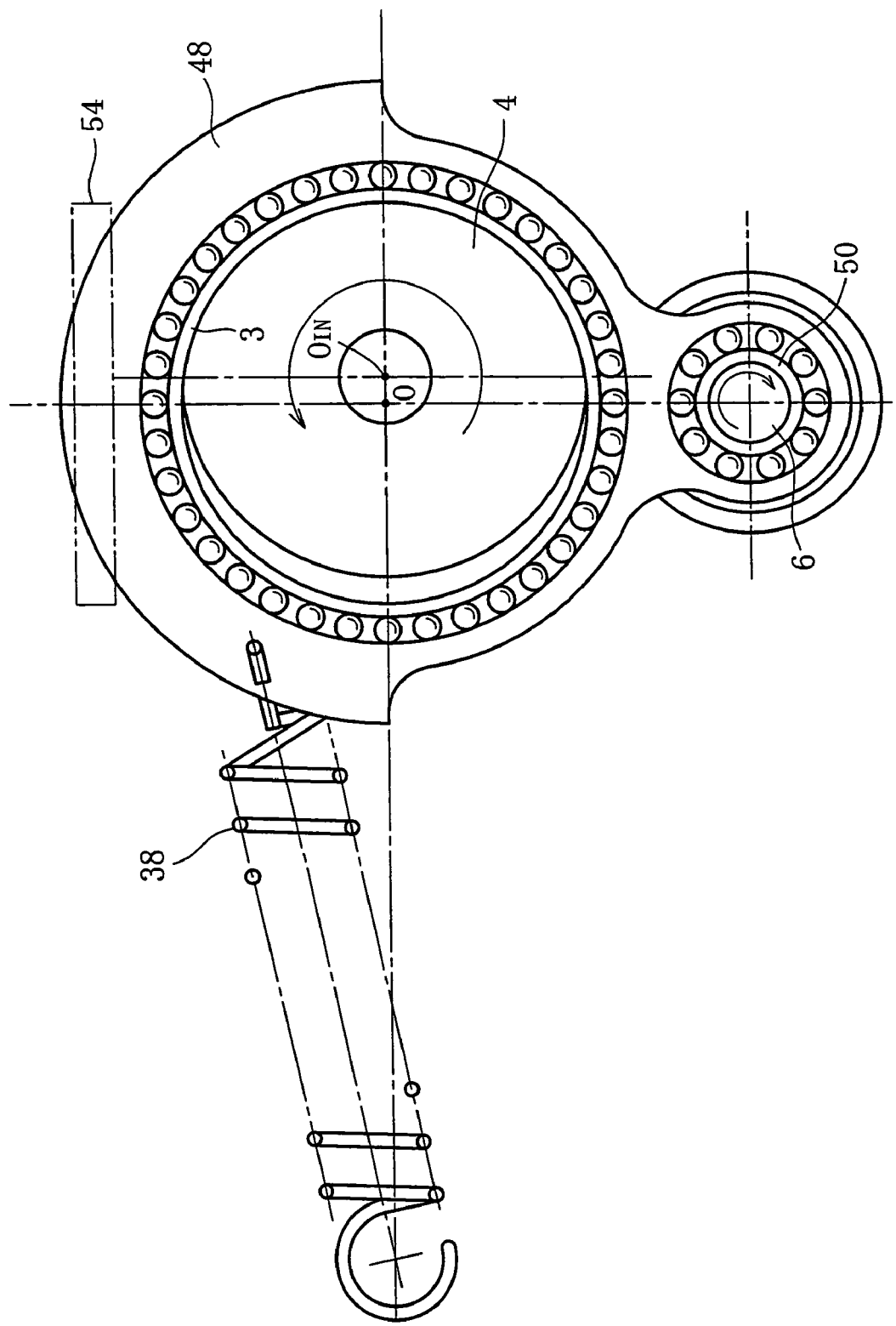
FIG. 18 is a cross sectional view showing another embodiment.

An embodiment shown in FIGS. 17 through 20 utilizes a rolling bearing for the support of the toothed ring 3. As shown in FIGS. 17 and 18, the outer periphery of the toothed ring 3 is provided with a plurality of teeth for meshing with the output gear 2, and raceways for balls to roll therein. To support the toothed ring 3 from outside through a rolling bearing, use is made of a support outer ring 48 in the form of a gourd (FIG. 18). The support outer ring 48 has two through holes, large and small, with a raceway formed in the inner peripheral surface of each through hole. In the through hole of large diameter in the support outer ring 48 is rotatably received the toothed ring 3 through a plurality of balls. In the through hole of small diameter in the support outer ring 48 is rotatably received an inner ring 50 through a plurality of balls. The inner ring 50 is fitted on the output shaft 6. As can be understood from FIG. 17, the support outer ring 48 is positioned from axially opposite sides by a pair of guide plates 54. In addition, the outer periphery of the shaft 7 is formed with a spiral oil supply groove 56 for forcibly supplying lubricating oil to the traction drive point.

Figure 19:
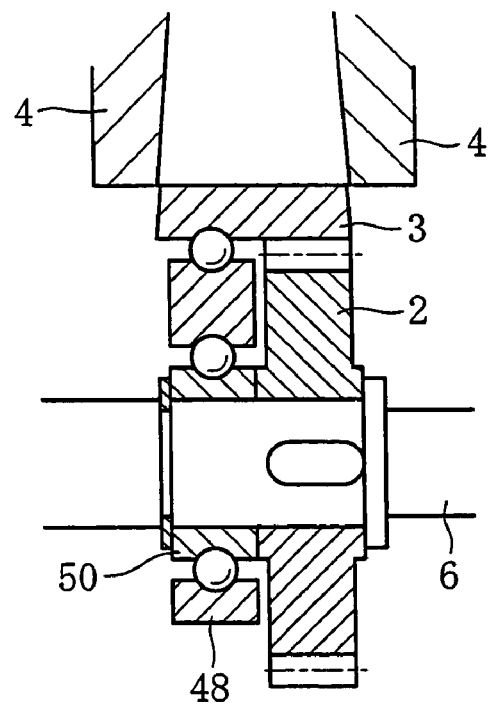
FIG. 19 is a sectional view showing a modification.
Figure 20:
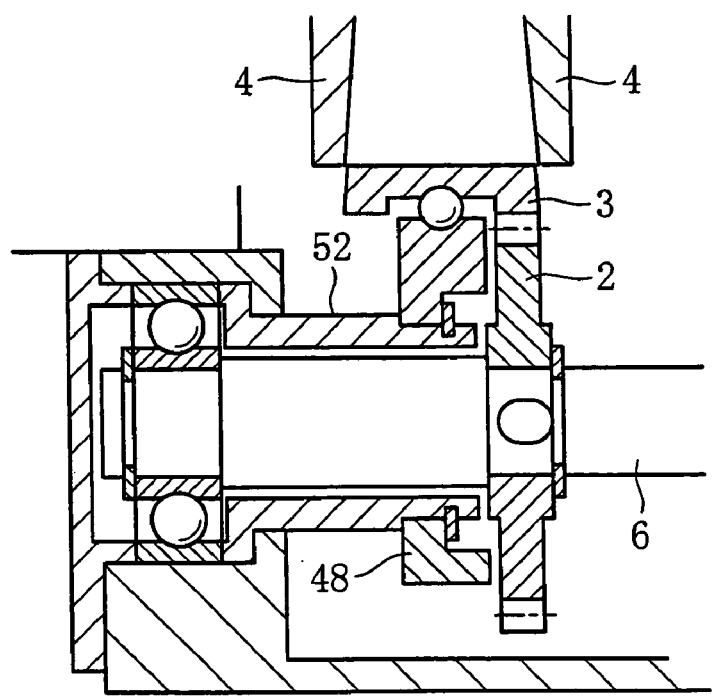
FIG. 20 is a sectional view showing a modification.

In FIG. 17, the respective raceways of the toothed ring 3 and inner ring 50 are aligned with the centerline of the toothed ring 3. However, as shown in FIG. 19, they may be given an offset by arranging the teeth and raceway of the toothed ring 3 on opposite sides of the centerline of the toothed ring 3. Further, FIG. 20 shows an example in which the support section of the support outer ring 48 has its rolling bearing replaced by a slide bearing. For example, a sleeve 52 is installed coaxially with the output shaft 6, with the support outer ring 48 rotatably fitted on the outer periphery of the sleeve 52. In the case of rotation on the output shaft 6, a rolling bearing function is required, but in the case of rotation on the sleeve 52, slide contact is sufficient since the slide speed is low.

What is claimed is:

1. A traction drive type continuously variable transmission characterized by comprising
    a first input/output shaft rotatably supported by a casing,
    a second input/output shaft rotatably supported by the casing,
    a V-pulley consisting of a pair of pulley members supported by the first input/output shaft and forming a V-shaped groove whose groove width is variable,
    a ring engaging the V-pulley and supported at the outer periphery,
    a mechanism for moving the ring around the second input/output shaft, the mechanism for moving the ring including an arm supported turnably around the second input/output shaft,
    at least three guide rollers disposed around the outer periphery of the ring, the guide rollers being rotatably supported by the arm, and
    a pair of face cams, movable and fixed, supported coaxially with the first input/output shaft, the movable face cam being movable axially of the first input/output shaft and being in direct or indirect contact with the V-pulley, the other face cam being fixed to the casing, the arrangement being such that when the movable face cam rotates, it moves toward or away from the fixed face cam, the movable face cam rotating in operative association with the turning of the arm.

2. A traction drive type continuously variable transmission as set forth in claim 1, characterized by including a gear fixed to the second input/output shaft, said ring having teeth meshing with the teeth of said gear and also having a smooth cylindrical guide surface, said ring being contacted at said guide surface with the guide rollers.

3. A traction drive type continuously variable transmission as set forth in claim 2, characterized in that the gear is supported coaxially with the turning shaft of the arm and meshes with the teeth formed in the movable face cam.

4. A traction drive type continuously variable transmission as set forth in claim 3, characterized in that the first input/output shaft is used as the input shaft, and the second input/output shaft is used as the output shaft.

5. A traction drive type continuously variable transmission as set forth in claim 3, characterized in that when the transmission torque increases, said ring moves in the direction to be pressed into between the pulley members.

6. A traction drive type continuously variable transmission as set forth in claim 2, characterized in that said guide rollers are in rolling contact with said ring.

7. A traction drive type continuously variable transmission as set forth in claim 6, characterized in that the change of the groove width of the V-pulley is operatively associated with the movement of said ring.

8. A traction drive type continuously variable transmission as set forth in claim 2, characterized in that said guide rollers are in slide contact with said ring.

9. A traction drive type continuously variable transmission as set forth in claim 8, characterized in that the change of the groove width of the V-pulley is operatively associated with the movement of said ring.

10. A traction drive type continuously variable transmission as set forth in claim 2, characterized in that the change of the groove width of the V-pulley is operatively associated with the movement of said ring.

11. A traction drive type continuously variable transmission as set forth in claim 2, characterized in that the first input/output shaft is used as the input shaft, and the second input/output shaft is used as the output shaft.

12. A traction drive type continuously variable transmission as set forth in claim 2, characterized in that when the transmission torque increases, said ring moves in the direction to be pressed into between the pulley members.

13. A traction drive type continuously variable transmission as set forth in claim 1, characterized in that said guide rollers are in rolling contact with said ring.

14. A traction drive type continuously variable transmission as set forth in claim 13, characterized in that the change of the groove width of the V-pulley is operatively associated with the movement of said ring.

15. A traction drive type continuously variable transmission as set forth in claim 1, characterized in that said guide rollers are in slide contact with said ring.

16. A traction drive type continuously variable transmission as set forth in claim 15, characterized in that the change of the groove width of the V-pulley is operatively associated with the movement of said ring.

17. A traction drive type continuously variable transmission as set forth in claim 1, characterized in that the change of the groove width of the V-pulley is operatively associated with the movement of said ring.

18. A traction drive type continuously variable transmission as set forth in claim 1, characterized in that the first input/output shaft is used as the input shaft, and the second input/output shaft is used as the output shaft.

19. A traction drive type continuously variable transmission as set forth in claim 1, characterized in that when the transmission torque increases, said ring moves in the direction to be pressed into between the pulley members.

* * * * *